Jan. 16, 1962   F. J. VON BOMHARD   3,017,001
AUTOMOTIVE CLUTCH CONTROL SYSTEM
Original Filed Feb. 5, 1959
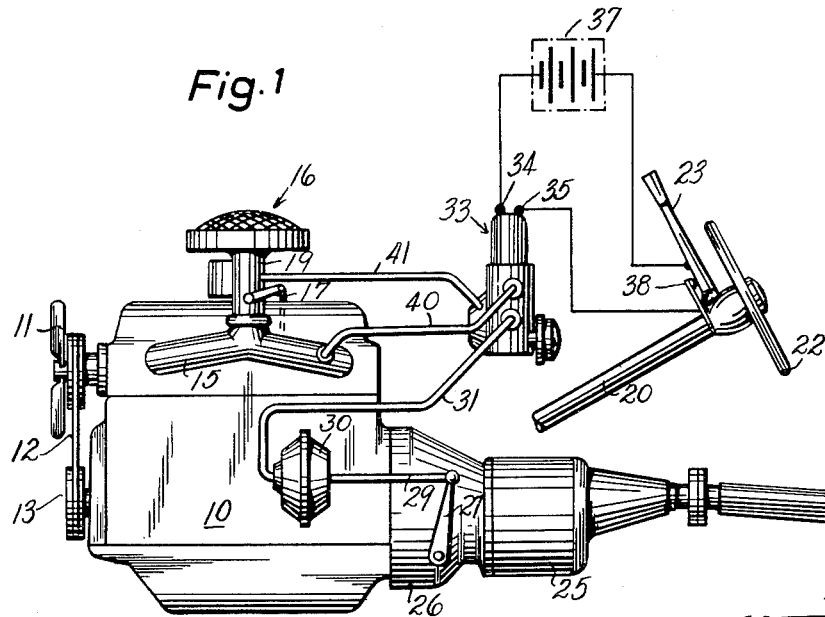
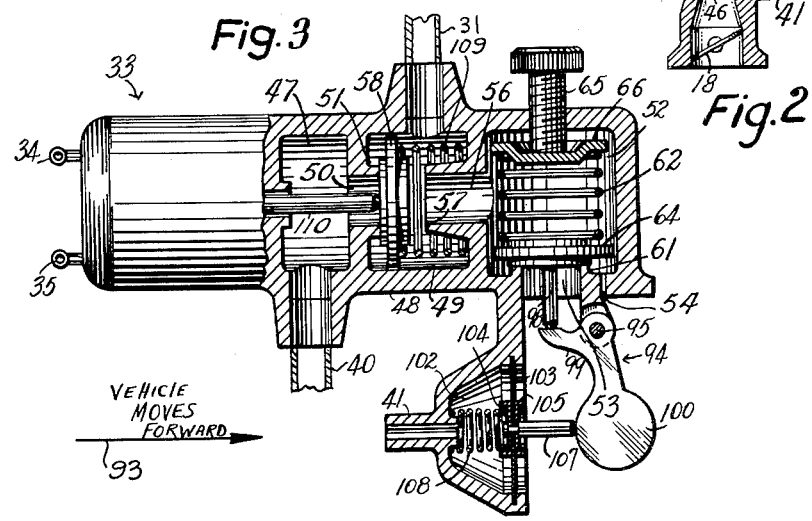
INVENTOR.
FRANZ JOSEPH Von BOMHARD
BY
Squire & Olcott
his Attorneys

United States Patent Office 3,017,001
Patented Jan. 16, 1962

3,017,001
AUTOMOTIVE CLUTCH CONTROL SYSTEM
Franz Josef Von Bomhard, Schweinfurt (Main), Germany, assignor to Fichtel & Sachs A.G., Schweinfurt (Main), Germany, a corporation of Germany
Original application Feb. 5, 1959, Ser. No. 791,482, now Patent No. 2,974,765, dated Mar. 14, 1961. Divided and this application Aug. 3, 1960, Ser. No. 53,329
Claims priority, application Germany Feb. 6, 1958
3 Claims. (Cl. 192—3.5)

The present invention relates to automatic clutch control systems of the type wherein the clutch of an automotive vehicle is disengaged during gear shifting and is reengaged at a controlled rate after gear shifting has been completed, the rate of reengagement being variable according to engine conditions so that both sudden jerks and undue slippage of the clutch are avoided.

This application is a division of my copending application Serial No. 791,482, filed on February 5, 1959, now Patent No. 2,974,765, issued on March 14, 1961.

The control system in accordance with the invention involves a control circuit which controls a solenoid valve, for example. The control circuit is energized during the shifting of gears. Where a manually operated gear shift lever is provided, the control circuit is energized while the gear shift lever is in transit between any two gear ratio selecting positions. Energization of the control circuit causes immediate and complete disengagement of the clutch by a suitable power operated clutch actuating device. Deenergization of the control circuit immediately causes a limited reengagement of the clutch accompanied by clutch slippage so that a sudden jerking of the vehicle is avoided. Thereafter, and depending upon engine operating conditions, the clutch is fully reengaged at a rate such that needless slippage of the clutch is prevented while at the same time, sudden or jerky reengagement is prevented.

The controlled rate of complete reengagement is regulated by inertia actuated means which are provided to obtain rapid clutch reengagement during actual acceleration of the vehicle.

The invention will be better understood from the following specification, reference being had to the accompanying drawing forming a part hereof.

Referring to the drawing:
FIGURE 1 is a schematic diagram showing the general arrangement of a clutch control system embodying the invention.
FIGURE 2 is an enlarged fragmentary view in sectional elevation showing the arrangement of the air inlet pressure or suction connection at the upstream side of the butterfly valve of the carburetor.
FIGURE 3 is an enlarged view in sectional elevation showing a solenoid actuated control valve which regulates the rate of clutch reengagement.

Referring to FIG. 1, there is shown the internal combustion engine 10 of an automotive vehicle. The engine 10 is provided with the usual cooling fan 11 driven by a fan belt 12 from a pulley 13 fixed to the crankshaft (not shown) of the engine 10. The engine 10 has an intake manifold 15 to which is connected a carburetor designated generally as 16. The carburetor 16 includes an accelerator lever 17 which is connected to the usual accelerator pedal (not shown). The accelerator lever 17 controls the position of a butterfly valve 18 (FIG. 2) disposed in the outlet duct 19 of the carburetor 16.

The vehicle is also provided with a steering column 20 upon which there is mounted a steering wheel 22 and a gear shift lever 23. The gear shift lever 23 may be manually displaced to select a desired one of a plurality of gear ratios within a transmission 25. The transmission 25 is connected to the engine 10 through a clutch 26.

The clutch 26 is provided with a control lever 27 which, when rotated in a counterclockwise direction as viewed in FIG. 1, will always disengage the clutch 26 when it would otherwise be engaged. The clutch 26 may be of the self-engaging type such as a centrifugal clutch or it may be selectively disengaged at will by operation of a foot pedal. Similarly, it may be automatically engaged and disengaged by other means depending on engine speed or a combination of engine speed and vehicle speed conditions. Regardless of the particular form of construction of the clutch 26, it will always become disengaged when it would otherwise be engaged by movement of the clutch control lever 27 as described above. It will become reengaged progressively as the control lever 27 is rotated in a clockwise direction as viewed in FIG. 1. Sudden and complete clockwise movement of the control lever 27 will cause abrupt reengagement of the clutch 26 and this undesirable type of reengagement is prevented by the control system of the present invention in a manner later to be described.

The clutch control lever 27 is connected by a rod 29 to a vacuum-operated servomotor 30. The servomotor 30 is connected by a suction line 31 to a solenoid-actuated control valve designated generally as 33. The solenoid valve 33 is provided with an operating winding (not shown) which is connected to terminals 34 and 35. The energizing or control circuit for the solenoid valve 33 includes a battery 37 and normally opens contacts 38 mounted on the steering column 20 and actuated by the gear shift lever 23. Whenever the gear shift lever 23 is in an intermediate position of transit between two operating positions so that no gear ratio is effective in the transmission 25, the contacts 38 are closed. In all operating positions of the gear shift lever 23, the contacts 38 are open. The contacts 38 are also open whenever the gear shift lever 23 is in its neutral position since there is then no need to disengage the clutch 26.

With the contacts 38 closed, the servomotor suction line 31 is connected to main suction line 40 which leads directly to the intake manifold 15. This causes operation of the servomotor 30 to produce immediate and complete disengagement of the clutch 26. When the contacts 38 open, the solenoid valve connects the servomotor 30 with the atmosphere, at first substantially directly, so that an immediate partial reengagement of the clutch 26 is obtained. Thereafter flow-restricting devices delay the restoration of full atmospheric pressure in the servomotor 30 so that full reengagement of the clutch 26 takes place smoothly and progressively.

Referring to FIGS. 1, 2 and 3, there is an auxiliary suction line 41 which extends between the carburetor 16 and the solenoid valve 33. At the carburetor 16, one end of the auxiliary suction line 41 communicates with the interior of the carburetor outlet duct 19 through a lateral orifice 42 formed in the wall of the duct 19. The orifice 42 is located immediately below a diffusing member 43. The diffusing member 43 is fixedly mounted on an arm 44, the arm 44 being fixed to the wall of the duct 19 so that the longitudinal passage 45 in the diffusing member 43 is coaxial with the duct 19. The diffusing member 43 serves to enhance the homogeneity of mixture of the air-fuel mixture which flows to the intake manifold 15 past the accelerator butterfly valve 18. It will be observed that the duct 19 is constricted to form a throat 46 and that the lateral orifice 42 is located at the throat 46 where the flow velocity is increased and the pressure correspondingly reduced when the butterfly valve 18 is widely open.

Referring to FIG. 3, the main suction line 40 communicates with a suction chamber 47 formed in the body 48 of the solenoid valve 33. The servomotor suction line 31 communicates with a central servomotor chamber 49 likewise formed in the body 48 of the solenoid valve 33. The suction and servomotor chambers 47 and 49 communicate with each other through a longitudinal passage 50 which terminates within the servomotor chamber 49 in a valve seat 51. Still another chamber 52 formed in the body 48 of solenoid valve 33 communicates continuously with the atmosphere through a main passage 53 and a metering orifice 54. The atmospheric pressure chamber 52 also communicates with the servomotor chamber 49 through a longitudinal passage 56 which is axially aligned with the passage 50 between the suction chamber 47 and the servomotor chamber 49. The passage 56 terminates within the servomotor chamber 49 in a valve seat 57. A double-faced valve member 58 is normally yieldingly pressed toward the left (as viewed in FIG. 3) into seating engagement with the valve seat 51 by a helical compression spring 109. The suction chamber 47 is thus normally shut off from communication with the servomotor chamber 49. Normally, the servomotor chamber 49 communicates with the atmospheric pressure chamber 52 through the passage 56 so that the servomotor suction line 31 is at atmospheric pressure.

Upon closure of the normally open switch contacts 38, the terminals 34 and 35 of the solenoid valve 33 are energized from the battery 37 and an actuating rod 110 is forced toward the right (as viewed in FIG. 3) so that the double-faced valve member leaves its normal engagement with valve seat 51 and engages the confronting valve seat 57. This energization of terminals 34 and 35 shuts off communication between the servomotor chamber 49 and atmospheric pressure chamber 52, placing the servomotor chamber 49 in communication with the suction chamber 47. Under these conditions, suction from the intake manifold 15 is transmitted over lines 40 and 31 to the servomotor 30 and the clutch control lever 27 is immediately displaced in a counterclockwise direction, thereby disengaging the clutch 26 during the shifting of gears. After gear shifting is completed, contacts 38 open and the servomotor suction line 31 is again placed in communication with the atmospheric pressure chamber 52. Restoration of full atmospheric pressure to the servomotor 30 is retarded, however, by the metering orifice 54. As hereinafter described in greater detail, an immediate partial restoration of atmospheric pressure takes place for partially reengaging the clutch 26 with clutch slippage which is followed by a controlled rate of complete reengagement, the slowest possible rate of complete clutch reengagement being determined by the metering orifice 54.

The passage 53 terminates within the atmospheric pressure chamber 52 in a valve seat 61. A helical compression spring 62 disposed within the atmospheric pressure chamber 52 yieldingly urges a valve member 64 into seating engagement with the valve seat 61. The pressure exerted by the spring 62 on the valve member 64 may be adjusted by means of a knurled adjusting screw 65 connected to a plate 66 against which the upper end of the spring 62 bears. The adjusting screw 65 is threaded into the body 48 of the solenoid valve 33. The spring 62 and valve member 64 together constitute a pressure regulating valve which remains closed in the absence of an adjustably predetermined minimum pressure differential between atmospheric pressure chamber 52 and the atmosphere.

The pressure differential at which the regulating valve 62—64 would otheriwse remain open may be reduced so that complete clutch reengagement is accelerated. The direction of forward travel of the vehicle is indicated by an arrow 93 which is pointed toward the right. The inertia member, designated generally as 94, is pivoted to the body 48 of the solenoid valve 33 by a pivot pin 95. The atmospheric pressure chamber 52 communicates directly with the atmosphere through the metering orifice 54, previously described.

A vertical push rod 98, suitably guided by conventional means (not shown) extends between an integrally formed arm portion 99 of inertia member 94 and the underside of regulating valve member 64. The inertia member 94 comprises a depending weight portion 100 the center of gravity of which is located to the right of the pivot pin 95. Thus, under static conditions, the arm 99 will tend to press upwardly on the push rod 98 by the action of gravity.

The auxiliary suction line 41 from the carburetor throat 46 communicates directly with a chamber 102 formed in the body 48 of the solenoid valve 33. The right hand side of the chamber 102 is closed by a diaphragm 103. The central portion of the diaphragm 103 is clamped between flat-bottomed cup members 104 and 105. A horizontal push rod 107 extends from the cup members 104-105 and its free right hand end engages the weight portion 100 of the inertial member 94. The push rod 107 is yieldingly urged toward the right by a helical compression spring 108 disposed within the chamber 102.

In operation, when the operator of the motor vehicle desires to shift gears, movement of the gear shift lever out of the position in which it is then located causes closure of contacts 38 and energization of terminals 34 and 35 of the solenoid valve 33. As described above, this connects the servomotor 30 with the intake manifold 15 through suction lines 31 and 40. When the gear shift lever is positioned to make the newly selected gear ratio effective in the transmission 25, contacts 38 open and remain open.

If the engine 10 is operating at low speed and the butterfly valve 18 is only slightly open, then substantially atmospheric pressure will prevail at the carburetor throat 46 and the full force of spring 108 will oppose action by the weight 100 on pressure regulating valve member 64. The pressure regulating valve 64—62—61—65 will therefore permit an immediate partial restoration of atmospheric pressure in the servomotor chamber 39 followed by a slow complete restoration through the orifice 54 and main atmospheric pressure passage 53. As a result, the clutch 26 is immediately partially reengaged, with an amount of clutch slippage which is appropriate for slow motor speed. The partial reengagement is followed by a slow complete reengagement the rate of which is determined solely by air flow through the orifice 54.

If, however, the engine is operating at high speed such that prolonged clutch slippage is objectionable, the butterfly valve 18 is relatively wide open and the rate of air flow through the carburetor throat 46 is a direct function of piston displacement and hence engine speed. Substantial suction is then present in the line 41 from the carburetor throat 46 and thus also within the interior of the chamber 102. The action of spring 108 is opposed by the diaphragm 103 and weight 100 is more free to lift the valve member 64 to provide for immediate restoration of atmospheric pressure in servomotor chamber 39. The rate of clutch reengagement is thus controlled both by engine speed and by the actual acceleration of the vehicle.

During deceleration, the weight 100 is urged toward the right by its inertia. The action of gravity, however, urges it toward the left. With suction in the carburetor throat 46, there is reduced pressure in the chamber 102 and the push rod 107 is withdrawn toward the left so that the arm 99 is free to press the vertical push rod 98 upwardly by the action of gravitational forces in the absence of inertia forces accompanying deceleration. Accordingly, a somewhat rapid clutch reengagement is obtained with suction in carburetor throat 46 except during rapid deceleration.

During acceleration, both the weight and inertia forces tend cumulatively to press the push rod 98 upwardly. This provides for rapid pick up by fast clutch reengagement. This action is opposed by the spring 108. As the engine speed increases and the suction in the carburetor throat 46 increases correspondingly, the action of spring 108 is overcome by the diaphragm 103 and the rate of clutch reengagement becomes even more rapid. The carburetor throat suction builds up as the engine speed increases, even though the acceleration decreases, so that rapid cluch reengagement proceeds without interruption as the vehicle picks up speed.

While there have been shown what are belived to be the best embodiments of the invention, it will be apparent to those skilled in the art that various changes and modifications may be made herein without departing from the spirit and scope of the invention as defined in the appended claims.

What is claimed is:

1. An automotive clutch control system, comprising suction actuable servomotor means connected for disengaging said clutch when it would otherwise be engaged; an internal combustion engine in driving connection with said clutch, said engine including an intake manifold for delivering an air-fuel mixture to said engine; a transmission driven by said engine through said clutch; gear shifting means for selecting a desired gear ratio within said transmission; a solenoid valve having a suction chamber, a servomotor chamber and atmospheric pressure chamber; an energizing circuit for said solenoid valve, said energizing circuit including switch means actuated by said gear shifting means for energizing said circuit during the changing of gear ratios in said transmisson; a first suction line connecting said suction chamber to said intake manifold; a second suction line connecting said servomotor chamber to said servomotor means; means defining a metering orifice through which said atmospheric pressure chamber communicates with the atmosphere; a valve member actuable upon energization of said energizing circuit which transfers said servomotor chamber from communication with said atmospheric pressure chamber into communication with said suction chamber, said valve member restoring the original communications among said chambers immediately upon deenergization of said energizing circuit; a pressure regulating valve by-passing said metering orifice; and inertia actuated means acting on said pressure regulating valve to reduce the pressure differential required for operation of said pressure regulating valve during acceleration of a vehicle propelled by said engine.

2. A system according to claim 1, further comprising a carburetor having an outlet duct connected to said intake manifold, a control valve disposed in said duct, said duct having a constricted throat portion located upstream of said control valve, said throat portion having a lateral orifice formed therein, and pressure actuated means connected to said lateral orifice and acting on said inertia actuated means for causing said inertia actuated means to reduce said pressure differential in response to a reduced acceleration of said vehicle as the flow rate of said air-fuel mixture into said intake manifold increases.

3. A system according to claim 2, wherein said inertia actuated means includes a weight having a center of gravity disposed to cause said inertia actuated means to tend to reduce said pressure differential when the acceleration of said vehicle is zero.

References Cited in the file of this patent

UNITED STATES PATENTS

| | | |
|---|---|---|
| 2,156,136 | Watts | Apr. 25, 1939 |
| 2,173,116 | Kliesrath | Sept. 19, 1939 |
| 2,252,136 | Price | Aug. 12, 1941 |